April 4, 1939.　　A. MOORHOUSE　　2,153,097

TAPPET

Filed July 19, 1937

*INVENTOR*
ALFRED MOORHOUSE
BY Whittemore Hulbert & Belknap
*ATTORNEYS*

Patented Apr. 4, 1939

2,153,097

UNITED STATES PATENT OFFICE 2,153,097

TAPPET

Alfred Moorhouse, Detroit, Mich.

Application July 19, 1937, Serial No. 154,492

4 Claims. (Cl. 123—90)

The invention relates to hydraulic valve lifting means of that type in which a definite quantity of hydraulic fluid is sealed within an expansible unit and functions to automatically take up clearance without interfering with the seating of the valve. With constructions of this type it is essential to maintain a perfect seal, as otherwise escape of fluid would soon render the device inoperative. This has heretofore been attempted by a construction including a cylinder, a piston having a limited movement therein, a piston rod extending from said piston, an apertured head through which said piston rod passes, and a metallic bellows connecting the piston with said apertured head to form a sealed storage chamber for the hydraulic fluid, while permitting movement of the piston. A spring resiliently presses the piston when relieved of load in an outward direction, and a check valve controlled port through the piston permits rapid passage of fluid therethrough to take up clearance. On the other hand, when the piston is under load slow leakage of fluid between the same and the cylinder will permit the full seating of the valve. One defect in the construction just described is the danger of leakage between the cylinder and the apertured head. To permit assembly of the parts the head, after the connection of the metallic bellows to the same and to the piston, is pressed into the open end of the cylinder. This, while retaining the head in position, does not insure an absolute seal. Another defect is due to the exceedingly rapid movement of the parts when the engine is running at high speed. This sometimes synchronizes with the natural period of oscillation of the metallic bellows, thereby causing cumulative action resulting in breakage.

It is the object of the present invention to overcome the defects above referred to and to otherwise improve the device, and to this end the invention consists in the construction as hereinafter set forth.

Figure 1:
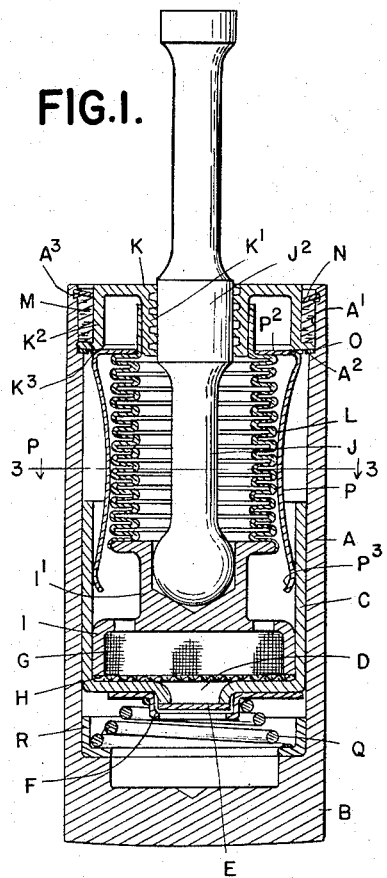
Figure 1 is a central longitudinal section through a valve lifter of my improved construction.
Figure 2:
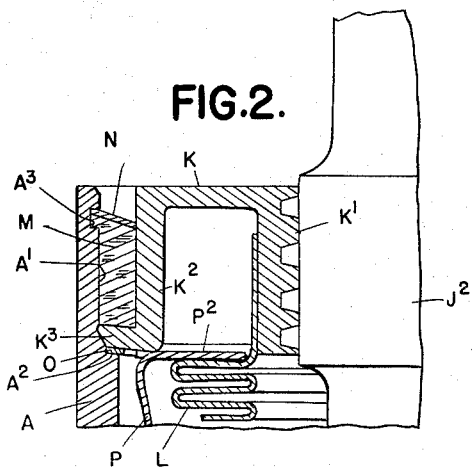
Figure 2 is an enlarged view through the cylinder head showing the sealing means therefor.
Figure 3:
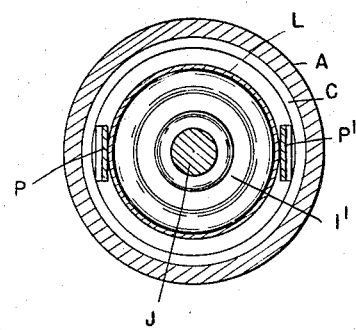
Figure 3 is a cross section on line 3—3 of Figure 1.
Figure 4:
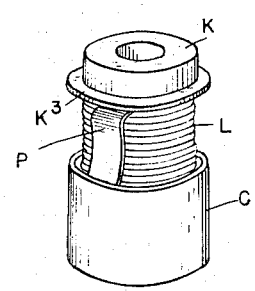
Figure 4 is a perspective view of the piston and associated parts detached from the cylinder.

As illustrated, A is a cylindrical casing having a solid head B at one end thereof for engagement with the cam or other valve actuating means. C is a piston within the cylinder A provided with a central port D normally closed by a disk valve E on the lower side thereof, said valve being held to the piston by a retainer F which permits only a very limited movement from its seat. Within the piston and above the port is arranged filtering material G through which the liquid may pass, while excluding the passage of any air or gas commingled with the liquid. The filtering material is preferably supported on a screen H above the port D and is retained within a cup-shaped end I of a plunger head I'. This head has a central socket for receiving the end of a removable rod or plunger J which passes outward through an apertured head K for closing the upper end of the cylinder. L is a metallic bellows, the lower end of which is soldered or otherwise sealed to the plunger head I', while its opposite end is similarly sealed to the head K. Thus when the parts are assembled, liquid being first placed in the cylinder, and the piston, plunger and head subsequently inserted therein, all escape of liquid will be prevented, provided that there is an effective seal between the cylinder and head.

As above stated, a pressed fit will not always be effective in producing a perfect seal and I have therefore provided the following construction: The head K is preferably formed with a central inwardly extending flange $K'$ surrounding the aperture therethrough and an outer or peripheral cylindrical flange $K^2$ terminating at its lower end in a radially outwardly extending flange $K^3$. The upper end of the cylinder is counterbored at $A'$ to receive the flange $K^3$ and to form a shoulder $A^2$ for limiting the inward movement of said flange. M is an annular packing member formed of suitable compressible material such as cork which surrounds the peripheral flange $K^2$ and bears at its lower end against the flange $K^3$. Above this packing ring is a slightly dished annular metallic member N which during assembly is pressed downward against the member M until its outer edge springs into engagement with an annular groove $A^3$ in the cylinder A. This occurs only after the member M has been subjected to fairly high pressure and the natural resiliency of this member will then hold it in sealing contact with all of the surrounding surfaces. I preferably also place an annular member O of softer metal between the shoulder $A^2$ and the flange $K^3$ to produce a further sealing effect. Thus, when the head K is engaged with the cylinder, a certain quantity of air will be trapped in between the flanges $K'$ and $K^2$ and will be placed under compression. This will form a resilient cushion permitting of expansion and contraction of the liquid, and also forming a means for urging the liquid through the port D whenever the piston is relieved from load.

To check destructive vibration in the metallic bellows I place, preferably on diametrically opposite sides thereof, resilient friction members P and P'. These may be made of inwardly bowed strips of metal which at their upper ends are connected to an annular head $P^2$ between the flange $K^3$ and the upper end of the bellows L. The lower ends of these members P and P' are slightly rounded inward as at $P^3$ and form stops for limiting the outward movement of the plunger head I' and piston C. This outward movement is effected by the actuation of a spring Q which is placed between the solid head B and the piston. This spring is preferably conical, its upper end engaging a flange on the retainer F to hold the same in engagement with the piston. There is also preferably a cup-shaped member R between the lower end of the spring and the head B, the flange of said cup serving as a stop for limiting the downward movement of the piston. With this construction, after the parts are assembled there will be sufficient friction between the bowed members P and P' and the central portion of the bellows L to check any periodic vibration, thereby avoiding the danger of breakage.

The construction as above described may be used either as original installation in an internal combustion engine or as a replacement for mechanical tappets. Such replacement is facilitated by the fact that the plunger J is detachable from the plunger head I' so that the cylinder A may be engaged with the bearing on the engine casing which holds it in operative relation to the cam. The plunger J may then be inserted through the apertured head K and to facilitate this said plunger is reduced in diameter between a lower spherical head portion J' and a bearing portion $J^2$ which slidably fits within the flange K'.

In operation, whenever the engine is idle slow leakage of liquid past the piston under the actuation of the valve closing spring will permit the valve to close unless held from its seat by the position of the cam. In the latter case, movement of the piston is limited by the stop R. When, however, the engine is started and the cam is withdrawn to permit the seating of the valve, the spring Q will force the piston in the opposite direction, the check valve E permitting the passage of fluid.

After the engine is in full operation the movement which occurs between the piston and cylinder in any one cycle is very small, but is sufficient to take up all lost motion while at the same time permitting the engine valve to fully seat.

What I claim as my invention is:

1. In a hydraulic valve lifter, the combination with a cylinder containing the hydraulic fluid, a piston therein, and a metallic bellows for sealing between said piston and cylinder while permitting relative movement thereof, of means cooperating with said bellows to check cumulative oscillations thereof.

2. In a hydraulic valve lifter, the combination with a cylinder containing the hydraulic fluid, a piston therein, and a metallic bellows for sealing between said piston and cylinder while permitting relative movement thereof, of a shoe frictionally engaging said bellows to check cumulative oscillations thereof.

3. In a hydraulic valve lifter, the combination with a cylinder containing the hydraulic fluid, a piston therein, and a metallic bellows for sealing between said piston and cylinder while permitting relative movement thereof, of a bowed spring arranged between said cylinder and bellows to frictionally bear on the latter and to check cumulative oscillations.

4. In a hydraulic valve lifter, the combination with a cylinder containing the hydraulic fluid, a piston therein, and a metallic bellows for sealing between said piston and cylinder while permitting relative movement thereof, of a plurality of bowed springs arranged between said cylinder and bellows to frictionally bear against the latter, said springs constituting a dampening means for checking cumulative oscillations of said bellows and the ends of said springs forming stops for limiting the movement of said piston.

ALFRED MOORHOUSE.